United States Patent
Corrales et al.

(10) Patent No.: US 9,967,274 B2
(45) Date of Patent: May 8, 2018

(54) SYSTEMS AND METHODS FOR IDENTIFYING COMPROMISED DEVICES WITHIN INDUSTRIAL CONTROL SYSTEMS

(71) Applicant: Symantec Corporation, Mountain View, CA (US)

(72) Inventors: Ignacio Bermudez Corrales, Sunnyvale, CA (US); Alok Tongaonkar, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 202 days.

(21) Appl. No.: 14/952,344

(22) Filed: Nov. 25, 2015

(65) Prior Publication Data
US 2017/0149811 A1    May 25, 2017

(51) Int. Cl.
*H04L 29/06* (2006.01)
*G05B 19/418* (2006.01)

(52) U.S. Cl.
CPC ...... *H04L 63/1425* (2013.01); *G05B 19/4185* (2013.01); *H04L 63/1441* (2013.01)

(58) Field of Classification Search
CPC ............ H04L 63/1425; H04L 63/1441; G05B 19/4185
See application file for complete search history.

(56) References Cited

U.S. PATENT DOCUMENTS 6,775,827 B1 * 8/2004 Harkins .............. G06F 11/3624
                                                     714/E11.209
7,015,811 B2    3/2006 Decker et al.
(Continued)

FOREIGN PATENT DOCUMENTS

| CN | 102571469 A | 7/2012 |
| CN | 102893289 A | 1/2013 |
| EP | 2515250 A1 | 10/2012 |

OTHER PUBLICATIONS

Steven Noel et al., "Correlating Intrusion Events and Building Attack Scenarios Through Attack Graph Distances", Computer Security Applications Conference, 2004. 20th Annual Tucson, AZ, USA Dec. 6-10, 2004, (Dec. 10, 2004), pp. 350-359.
(Continued)

*Primary Examiner* — Joseph P Hirl
*Assistant Examiner* — J. Brant Murphy
(74) *Attorney, Agent, or Firm* — FisherBroyles, LLP

(57) ABSTRACT

The disclosed computer-implemented method for identifying compromised devices within industrial control systems may include (1) monitoring network traffic within a network that facilitates communication for an industrial control system that includes an industrial device, (2) creating, based at least in part on the network traffic, a message protocol profile for the industrial device that describes (A) a network protocol used to communicate with the industrial device and (B) normal communication patterns of the industrial device, (3) detecting at least one message that involves the industrial device and at least one other computing device included in the industrial control system, (4) determining, by comparing the message with the message protocol profile, that the message represents an anomaly, and then (5) determining, based at least in part on the message representing the anomaly, that the other computing device has likely been compromised. Various other methods, systems, and computer-readable media are also disclosed.

20 Claims, 7 Drawing Sheets

(56) References Cited

U.S. PATENT DOCUMENTS

| | | |
|---|---|---|
| 7,475,124 B2 | 1/2009 | Jiang et al. |
| 7,673,074 B1 | 3/2010 | Sebastian et al. |
| 7,861,300 B2 | 12/2010 | Arnold et al. |
| 8,104,090 B1 | 1/2012 | Pavlyushchik |
| 8,126,891 B2 | 2/2012 | Laxman et al. |
| 8,341,745 B1 | 12/2012 | Chau et al. |
| 8,544,087 B1 | 9/2013 | Eskin et al. |
| 8,566,938 B1 | 10/2013 | Prakash et al. |
| 8,925,037 B2 | 12/2014 | Marino et al. |
| 8,973,133 B1 | 3/2015 | Cooley |
| 9,053,516 B2 | 6/2015 | Stempora |
| 9,088,560 B1 | 7/2015 | Newstadt et al. |
| 9,141,790 B2 | 9/2015 | Roundy et al. |
| 9,148,441 B1 | 9/2015 | Tamersoy et al. |
| 9,166,997 B1 | 10/2015 | Guo et al. |
| 9,256,739 B1 | 2/2016 | Roundy et al. |
| 9,332,030 B1 | 5/2016 | Pereira |
| 9,384,066 B1 | 7/2016 | Leita et al. |
| 9,473,380 B1 | 10/2016 | Bermudez et al. |
| 9,529,990 B2 | 12/2016 | Newstadt et al. |
| 9,582,669 B1 | 2/2017 | Shen et al. |
| 2004/0044771 A1 | 3/2004 | Allred et al. |
| 2004/0059822 A1 | 3/2004 | Jiang et al. |
| 2005/0030969 A1 | 2/2005 | Fredriksson |
| 2005/0138413 A1 | 6/2005 | Lippmann et al. |
| 2006/0095573 A1 | 5/2006 | Carle et al. |
| 2006/0236374 A1* | 10/2006 | Hartman ............... H04L 43/00 726/3 |
| 2008/0134327 A1 | 6/2008 | Bharrat et al. |
| 2009/0144308 A1 | 6/2009 | Huie et al. |
| 2009/0157365 A1 | 6/2009 | Higuchi et al. |
| 2010/0186088 A1 | 7/2010 | Banerjee et al. |
| 2010/0192226 A1 | 7/2010 | Noel et al. |
| 2010/0235879 A1 | 9/2010 | Burnside et al. |
| 2011/0019774 A1 | 1/2011 | Furuta |
| 2011/0047620 A1 | 2/2011 | Mahaffey et al. |
| 2011/0083180 A1 | 4/2011 | Mashevsky et al. |
| 2011/0302656 A1* | 12/2011 | El-Moussa ......... H04L 63/1425 726/24 |
| 2011/0314546 A1* | 12/2011 | Aziz ...................... G06F 21/56 726/24 |
| 2011/0320617 A1 | 12/2011 | Annamalaisami et al. |
| 2012/0144468 A1 | 6/2012 | Pratt et al. |
| 2012/0233683 A1 | 9/2012 | Ibrahim et al. |
| 2013/0031037 A1* | 1/2013 | Brandt ............... H04L 63/1408 706/12 |
| 2013/0042294 A1 | 2/2013 | Colvin et al. |
| 2013/0212659 A1 | 8/2013 | Maher et al. |
| 2013/0333032 A1 | 12/2013 | Delatorre et al. |
| 2014/0226664 A1 | 8/2014 | Chen et al. |
| 2014/0258379 A1 | 9/2014 | L'Heureux et al. |
| 2014/0365646 A1 | 12/2014 | Xiong |
| 2015/0113638 A1 | 4/2015 | Valasek et al. |
| 2015/0150124 A1 | 5/2015 | Zhang et al. |
| 2015/0261655 A1 | 9/2015 | Versteeg et al. |
| 2015/0281047 A1 | 10/2015 | Raju et al. |
| 2016/0261482 A1* | 9/2016 | Mixer ..................... H04L 43/12 |
| 2016/0357177 A1* | 12/2016 | Chand ............... G05B 19/4185 |
| 2017/0054751 A1* | 2/2017 | Schneider .......... H04L 63/1425 |
| 2017/0118234 A1 | 4/2017 | Arora et al. |

OTHER PUBLICATIONS

Mahoney, Network traffic anomaly detection based on packet bytes, Proceedings of the 2003 ACM symposium on Applied computing, pp. 346-350, Mar. 9, 2003.

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks.pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, On or before Aug. 29, 2014.

CAN protocol specification; http://www.can-cia.org/index.php?id=164, as accessed Aug. 29, 2014, Oct. 17, 2010.

Controller Area Network (CAN) Overview; http://www.ni.com/white-paper/2732/en/, as accessed Aug. 29, 2014; National Instruments Corporation, Aug. 1, 2014.

Driver Feedback; https://play.google.com/store/apps/details?id=com.statefarm.driverfeedback, as accessed Aug. 29, 2014; State Farm Insurance, Android Apps on Google Play, Jun. 2, 2013.

Electronic control unit; https://en.wikipedia.org/wiki/Electronic_control_unit, as accessed Feb. 9, 2015; Wikipedia, Jul. 28, 2004.

EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC, Jun. 2014—Rev. 2.

Emulation; https://en.wikipedia.org/wiki/Emulation, as accessed Feb. 9, 2015; Wikipedia, Dec. 3, 2003.

(56) References Cited

OTHER PUBLICATIONS

FlexRay Automotive Communication Bus Overview; http://www.ni.com/white-paper/3352/en/, as accessed Aug. 29, 2014; National Instruments Corporation, Aug. 21, 2009.
Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
Regev; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Yun Shen, et al; Systems and Methods for Detecting Discrepancies in Automobile-Network Data; U.S. Appl. No. 14/525,715, filed Oct. 28, 2014.
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That Are Obscured in Multicast Communications; U.S. Appl. No. 15/194,337, filed Jun. 27, 2016.
Vishal Bajpai et al.; System and Method for Identifying an Invalid Packet on a Controller Area Network (CAN) Bus; U.S. Appl. No. 15/056,864, filed Feb. 29, 2016.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.
Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as

(56) References Cited

OTHER PUBLICATIONS accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, Fire Eye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On The Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011, PowerPoint Slides, Jul. 22, 2012.
Asi, et al., Black Box System Design, Dec. 14, 2010.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: On the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.

(56) References Cited

OTHER PUBLICATIONS

Mantere; Network Traffic Features for Anomaly Detection in Specific Industrial Control System Network; Future Internet 2013, vol. 5 (6), MDPI.

Perdisci; McPad : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.

Snort (software); https://en.wikipedia.org/wiki/Snort_(software), as accessed Sep. 29, 2015; Wikipedia.

The Bro Network Security Monitor; https://www.bro.org/, as accessed Sep. 29, 2015.

Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.

Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.

Walter Bogorad; Systems and Methods for Detecting Anomalies That Are Potentially Indicative of Malicious Attacks; U.S. Appl. No. 15/059,326, filed Mar. 3, 2016.

Aggarwal; Outlier Analysis; http://www.springer.com/us/book/9781461463955, as accessed Feb. 1, 2016, (2013).

Dunning; Practical Machine Learning: A New Look At Anomaly Detection; https://www.mapr.com/practical-machine-learning-new-look-anomaly-detection, as accessed Feb. 1, 2016, (Jul. 21, 2014).

Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).

Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).

Yolacan; Learning From Sequential Data For Anomaly Detection; https://repository.library.northeastern.edu/downloads/neu:349795, as accessed Feb. 1, 2016; Dissertation, (Oct. 2014).

Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.

K. Nyalkalkar et al., "A comparative study of two network-based anomaly detection methods," in 2011 Proceedings IEEE INFOCOM, 2011.

S. Sinha et al., "WIND: Workload-Aware INtrusion Detection," in Recent Advances in Intrusion Detection, D. Zamboni and C. Kruegel, Eds. Springer Berlin Heidelberg, 2006.

L. Huang et al., "In-network PCA and anomaly detection," in In NIPS, 2006.

N. Goldenberg et al., "Accurate modeling of Modbus/TCP for intrusion detection in SCADA systems," Int. J. Crit. Infrastruct. Prot., vol. 6, No. 2, Jun. 2013.

M.-K. Yoon et al., "Communication Pattern Monitoring: Improving the Utility of Anomaly Detection for Industrial Control Systems," in Internet Society, San Diego, CA, USA, 2014.

N. Borisov et al., "Generic Application-Level Protocol Analyzer and its Language," Microsoft Research, MSR-TR-2005-133, Feb. 2005.

Zhipeng Zhao et al.; Systems and Methods for Identifying Message Payload Bit Fields in Electronic Communications; U.S. Appl. No. 15/359,076, filed Nov. 22, 2016.

"Transmission Control Protocol", http://en.wikipedia.org/wiki/Transmission_Control_Protocol, as accessed Jul. 10, 2014, Wikipedia, (Dec. 18, 2003).

A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].

Extending schedulability analysis of Controller Area Network (CAN) for mixed (periodic/sporadic) messages (http://ieeexplore.ieee.org/document/6059010/); Sep. 5, 2011.

A structured approach to anomaly detection for in-vehicle networks (http://ieeexplore.ieee.org/stamp/stamp.jsp?arnumber=5604050); Aug. 23, 2010.

Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.

Vishal Bajpai et al,; System and Method for Identifying an Invalid Packet on a Controller Area Network (CAN) Bus; U.S. Appl. No. 15/056,864, filed Feb. 29, 2016.

Vishal Bajpai et al.; Systems and Methods for Identifying Suspicious Controller Area Network Messages; U.S. Appl. No. 15/587,762, filed May 5, 2017.

Steven Noel et al.; Correlating Intrusion Events and Building Attack Scenarios Through Attack Graph Distances; 20th Annual Computer Security Applications Conference; ACSAC '04; Tucson, AZ, USA; Dec. 6-10, 2004.

\* cited by examiner

SYSTEMS AND METHODS FOR IDENTIFYING COMPROMISED DEVICES WITHIN INDUSTRIAL CONTROL SYSTEMS

BACKGROUND

Industrial control systems are often used to control the functionality of devices and/or machinery that perform manufacturing and/or production operations within an industrial environment. For example, a nuclear power plant may implement and/or rely on an industrial control system to regulate the production and/or distribution of electrical power. This industrial control system may include a collection of sensors, actuators, controllers, control valves, motors, robotic devices, and/or computing devices. In this example, the nuclear power plant may represent a prime target of a terrorist attack due to the amount of devastation at stake in the event of a system failure and/or malfunction.

Unfortunately, due to the high security needs of certain industrial control systems, the network protocols with which these industrial control systems communicate are rarely documented and/or available to the public. As a result, conventional security technologies may be unable to meaningfully monitor network traffic within industrial control systems and/or detect suspicious behavior that suggests a particular device has potentially been compromised. Accordingly, conventional security technologies may be somewhat ineffective at identifying compromised devices within industrial control systems, potentially leaving such systems susceptible to attacks. The instant disclosure, therefore, identifies and addresses a need for improved systems and methods for identifying compromised devices within industrial control systems.

SUMMARY

As will be described in greater detail below, the instant disclosure describes various systems and methods for identifying compromised devices within industrial control systems. In one example, a computer-implemented method for identifying compromised devices within industrial control systems may include (1) monitoring network traffic within a network that facilitates communication for an industrial control system that includes at least one industrial device, (2) creating, based at least in part on the network traffic, a message protocol profile for the industrial device that describes (A) a network protocol used to communicate with the industrial device via the network and (B) normal communication patterns of the industrial device, (3) detecting at least one message within the network that involves the industrial device and at least one other computing device included in the industrial control system, (4) determining, by comparing the message with the message protocol profile for the industrial device, that the message represents an anomaly that is suspiciously inconsistent with the normal communication patterns of the industrial device, and then (5) determining, based at least in part on the message representing the anomaly, that the other computing device has likely been compromised.

In one example, the method may also include performing at least one security action with respect to the other computing device in response to determining that the other computing device has likely been compromised. Examples of the security action include, without limitation, raising an alarm that notifies at least one additional computing device that the other computing device has been compromised, quarantining the other computing device from the industrial network to prevent the other computing device from communicating with any additional computing devices within the industrial control system, shutting down the other computing device to prevent the other computing device from communicating with any additional computing devices within the industrial control system, blocking all messages between the other computing device and any additional computing devices within the industrial control system, replacing the other computing device within the industrial network by transferring at least one computing task of the other computing device to at least one additional computing device within the industrial control system, variations or combinations of one or more of the same, or any other suitable security action.

In one example, the method may also include detecting messages within the network that originate from or are destined for the industrial device. In this example, the method may further include identifying parameters included in fields of the messages. In one example, the message protocol profile may include and/or represent a baseline representation of the normal communication patterns of the industrial device from the parameters included in the fields of the messages. Examples of such parameters include, without limitation, an opcode included in a message originating from or destined for the industrial device, a size of a message originating from or destined for the industrial device, a structure of a message originating from or destined for the industrial device, a sequence number of a message originating from or destined for the industrial device, a counter that identifies a certain number of messages originating from or destined for the industrial device, a transaction identifier included in a message originating from or destined for the industrial device, variations or combinations of one or more of the same, or any other suitable parameters.

In one example, the method may also include creating a grouping of messages that have certain characteristics in common with respect to the industrial device. In this example, the method may further include building the baseline representation of the normal communication patterns of the industrial device by analyzing the grouping of messages and/or inserting a representation of the parameters identified in the fields of the messages into the baseline representation. Additionally or alternatively, the method may include determining that the message and the grouping of messages share the certain characteristics in common.

In one example, the method may also include identifying at least one parameter included in at least one field of the message. In this example, the method may further include determining that the parameter identified in the field of the message is suspiciously inconsistent with the baseline representation of the normal communication patterns of the industrial device.

In one example, the method may also include forming, based at least in part on the parameters identified in the fields of the messages, a set of policy rules that represent a reference for the normal communication patterns of the industrial device. In this example, the method may further include weighting, within a mathematical formula that facilitates calculating a risk score for computing devices communicating with the industrial device, a numerical value that represents a level of risk associated with violating at least one policy rule within the set of policy rules.

As another example, a system for implementing the above-described method may include (1) a monitoring module, stored in memory, that monitors network traffic within a network that facilitates communication for an industrial control system that includes at least one industrial device, (2) a profiling module, stored in memory, that creates, based at least in part on the network traffic, a message protocol profile for the industrial device that describes (A) a network protocol used to communicate with the industrial device via the network and (B) normal communication patterns of the industrial device, (3) a detection module, stored in memory, that detects at least one message within the network that involves the industrial device and at least one other computing device, (4) a determination module, stored in memory, that (A) determines, by comparing the message with the message protocol profile for the industrial device, that the message represents an anomaly that is suspiciously inconsistent with the normal communication patterns of the industrial device and (B) determines, based at least in part on the message representing the anomaly, that the other computing device has likely been compromised, and (5) at least one physical processor that executes the monitoring module, the profiling module, the detection module, and the determination module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor network traffic within a network that facilitates communication for an industrial control system that includes at least one industrial device, (2) create, based at least in part on the network traffic, a message protocol profile for the industrial device that describes (A) a network protocol used to communicate with the industrial device via the network and (B) normal communication patterns of the industrial device, (3) detect at least one message within the network that involves the industrial device and at least one other computing device included in the industrial control system, (4) determine, by comparing the message with the message protocol profile for the industrial device, that the message represents an anomaly that is suspiciously inconsistent with the normal communication patterns of the industrial device, and then (5) determine, based at least in part on the message representing the anomaly, that the other computing device has likely been compromised.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
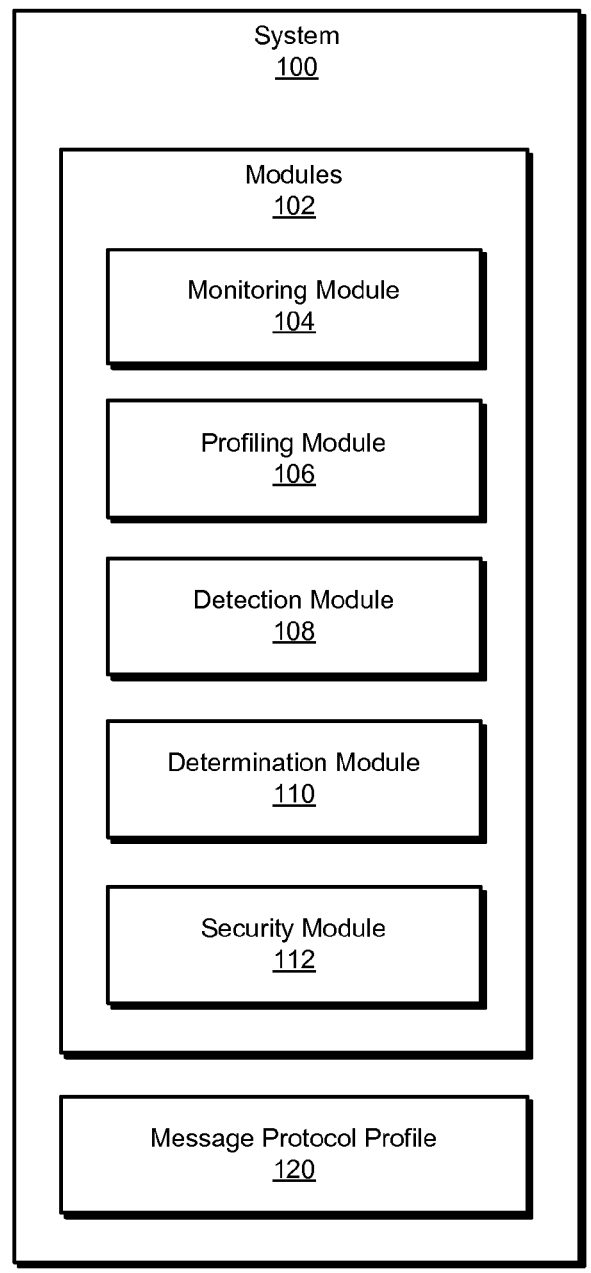
FIG. 1 is a block diagram of an exemplary system for identifying compromised devices within industrial control systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying compromised devices within industrial control systems. As will be explained in greater detail below, by monitoring network traffic within an industrial network, the various systems and methods described herein may be able to learn and/or reverse-engineer the communication protocol used by an industrial control system communicating via the industrial network even though the communication protocol is undocumented and/or unavailable to the public. Upon learning and/or reverse-engineering the communication protocol in this way, the various systems and methods described herein may group similar traffic into groups of messages that have certain characteristics in common (e.g., the same communication protocol, the same destination Internet Protocol (IP) address, and/or the same destination port number). These systems and methods may then build a message protocol profile that describes the normal communication patterns of the source or destination device and/or the communication protocol used to communicate a corresponding group of messages over the industrial network.

Moreover, by building a message protocol profile for the source or destination device in this way and then comparing future messages against the message protocol profile, these systems and methods may be able to determine whether any of the future messages represent an anomaly that is suspiciously inconsistent with the normal communication patterns of the source or destination device. In the event that one or more of the future messages represents such an anomaly, these systems and methods may determine that the source or destination device has likely been compromised.

Figure 2:
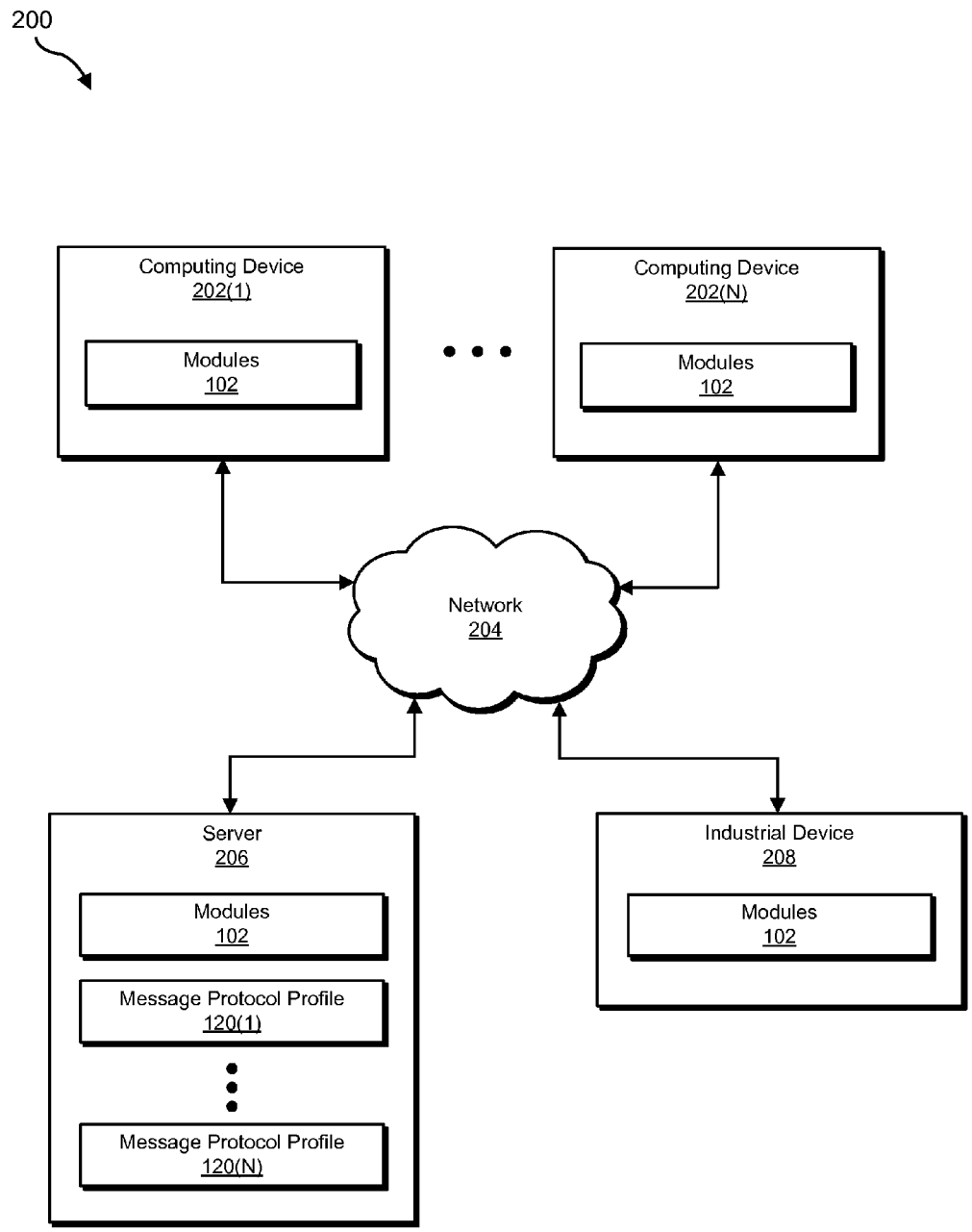
FIG. 2 is a block diagram of an additional exemplary system for identifying compromised devices within industrial control systems.

The following will provide, with reference to FIGS. 1-2, detailed descriptions of exemplary systems for identifying compromised devices within industrial control systems. Detailed descriptions of corresponding computer-implemented methods will be provided in connection with FIG. 3. Detailed descriptions of an exemplary message protocol profile and an exemplary message will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for identifying compromised devices within industrial control systems. As illustrated in this figure, exemplary system 100 may include one or more modules 102 for performing one or more tasks. For example, and as will be explained in greater detail below, exemplary system 100 may include a monitoring module 104 that monitors network traffic within a network that facilitates communication for an industrial control system that includes at least one industrial device. Exemplary system 100 may also include a profiling module 106 that creates, based at least in part on the network traffic, a message protocol profile for the industrial device that describes (1) a network protocol used to communicate with the industrial device via the network and (2) normal communication patterns of the industrial device.

In addition, and as will be described in greater detail below, exemplary system 100 may include a detection module 108 that detects at least one message within the network that involves the industrial device and at least one other computing device included in the industrial control system. Exemplary system 100 may include a determination module 110 that (1) determines, by comparing the message with the message protocol profile for the industrial device, that the message represents an anomaly that is suspiciously inconsistent with the normal communication patterns of the industrial device and (2) determines, based at least in part on the message representing the anomaly, that the other computing device has likely been compromised. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), server 206, and/or industrial device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more message protocol profiles, such as message protocol profile 120. In one example, message protocol profile 120 may identify, represent, and/or describe a proprietary network protocol used to communicate via an industrial network and/or with devices included in an industrial control system. In this example, message protocol profile 120 may identify, represent, and/or describe the structure of messages exchanged among devices, the fields of such messages, and/or the sequence numbering of such messages.

Additionally or alternatively, message protocol profile 120 may identify, represent, and/or describe the normal communication patterns of one or more industrial devices included in an industrial control system. For example, message protocol profile 120 may include a baseline representation of typical payloads, parameters, and/or content included in messages sent to one or more industrial devices. Such communication patterns may include and/or be represented by opcodes typically included in messages exchanged by devices, data parameters and/or values typically included in such messages, devices that typically communicate with one another, and/or the number of messages typically exchanged by devices over a certain period of time and/or at a certain time of day. Although FIG. 1 illustrates only a single message protocol profile, other embodiments may include and/or involve multiple message protocol profiles that correspond to the various devices that are included in and/or interface with an industrial control system.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing devices 202(1)-(N), server 206, and/or industrial device 208. In one example, one or more of computing devices 202(1)-(N) may be programmed with one or more of modules 102. Additionally or alternatively, server 206 and/or industrial device 208 may be programmed with one or more of modules 102.

In one example, one or more of computing devices 202(1)-(N) may store one or more of message protocol profiles 120(1)-(N). Additionally or alternatively, server 206 and/or industrial device 208 may store one or more of message protocol profiles 120(1)-(N).

In one embodiment, one or more of modules 102 from FIG. 1 may, when executed by at least one processor of server 206, enable server 206 to identify compromised devices within industrial control systems. For example, and as will be described in greater detail below, one or more of modules 102 may cause server 206 to (1) monitor network traffic within network 204, (2) create, based at least in part on the network traffic, message protocol profile 120(1) for industrial device 208, which describes (A) the network protocol used to communicate with industrial device 208 via network 204 and (B) normal communication patterns of industrial device 208, (3) detect at least one message within network 204 that involves industrial device 208 and computing device 202(1) included in the industrial control system, (4) determine, by comparing the message with message protocol profile 120(1) for industrial device 208, that the message represents an anomaly that is suspiciously inconsistent with the normal communication patterns of industrial device 208, and then (5) determine, based at least in part on the message representing the anomaly, that computing device 202(1) has likely been compromised.

Computing devices 202(1)-(N) generally represents any type or form of computing device capable of reading computer-executable instructions. Examples of computing devices 202(1)-(N) include, without limitation, industrial devices, controllers, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, exemplary computing system 610 in FIG. 6, or any other suitable computing devices.

Server 206 generally represents any type or form of computing device capable of identifying compromised devices within industrial control systems. Examples of server 206 include, without limitation, network devices (such as routers and/or switches), network servers, application servers, security servers, web servers, and/or database servers configured to run certain software applications and/or provide various networking, security, web, and/or database services. Although illustrated as a single entity in FIG.

2, server 206 may alternatively include and/or represent multiple servers running within exemplary system 200.

Industrial device 208 generally represents any type or form of computer-controlled mechanical device capable of performing manufacturing, service, and/or production operations. Examples of industrial device 208 include, without limitation, sensors, actuators, controllers, control valves, motors, robotic devices, embedded systems, computing devices, controllers, variations or combinations of one or more of the same, or any other suitable industrial device.

Network 204 generally represents any medium or architecture capable of facilitating communication or data transfer. Examples of network 204 include, without limitation, an intranet, private networks, industrial networks, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless and/or wired connections. In one embodiment, network 204 may facilitate communication among computing devices 202(1)-(N), server 206, and/or industrial device 208.

Figure 3:
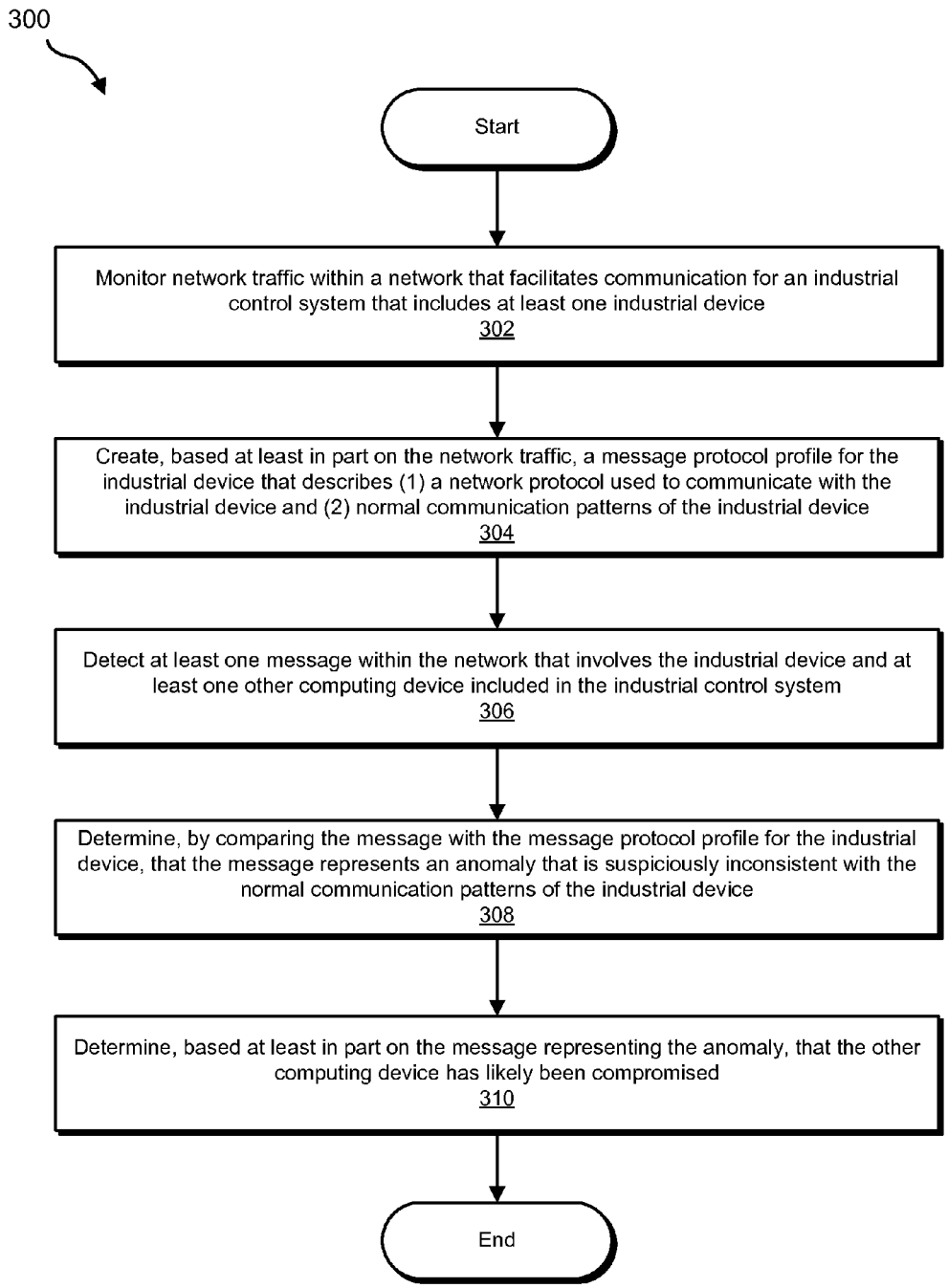
FIG. 3 is a flow diagram of an exemplary method for identifying compromised devices within industrial control systems.

FIG. 3 is a flow diagram of an exemplary computer-implemented method 300 for identifying compromised devices within industrial control systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor network traffic within a network that facilitates communication for an industrial control system that includes at least one industrial device. For example, monitoring module 104 may, as part of server 206 in FIG. 2, monitor network traffic within network 204 that facilitates communication for an industrial control system that includes industrial device 208. The term "network traffic," as used herein, generally refers to any type or form of communication, message, and/or data transfer that passes from one computing device to another.

The term "industrial control system," as used herein, generally refers to any type or form of system and/or mechanism that controls and/or performs manufacturing, service, and/or production operations. In one example, the industrial control system may include all or a portion of the components included in system 200 in FIG. 2. For example, the industrial control system may include one or more of computing devices 202(1)-(N), network 204, server 206, and/or industrial device 208.

The systems described herein may perform step 302 in a variety of ways. In some examples, monitoring module 104 may monitor the network traffic within network 204 by detecting and/or identifying messages exchanged between devices included in the industrial control system. For example, monitoring module 104 may detect and/or identify messages sent by computing device 202(1) to computing device 202(N) and/or industrial device 208. Additionally or alternatively, monitoring module 104 may detect and/or identify messages sent by industrial device 208 to one or more of computing devices 202(1)-(N). Accordingly, monitoring module 104 may detect and/or count the messages that originate from or are destined for industrial device 208.

In some examples, profiling module 106 may determine, deduce, and/or infer the network protocol used by devices within the industrial control system to communicate with one another via network 204. For example, profiling module 106 may parse and/or break down the data included in the payload of messages detected within network 204. In this example, profiling module 106 may look for and/or identify certain patterns found within the data included in the payload of those messages. Profiling module 106 may then learn and/or reverse-engineer the network protocol from the patterns found within the payload of those messages.

In some examples, monitoring module 104 may create a grouping of messages that have certain characteristics in common. For example, monitoring module 104 may group a set of messages together based at least in part on the messages' component layer (such as Transport Layer 4 of the Internet protocol suite), the messages' destination IP address, and/or the messages' destination port number. As a specific example, monitoring module 104 may group all of the messages that are (1) encapsulated in accordance with Transport Layer 4, (2) destined for IP address 192.168.2.17, and (3) destined for port number 80 within network 204. Once monitoring module 104 has grouped the set of messages together in this way, profiling module 106 may be able to learn and/or reverse-engineer the network protocol used by the device that has those specific characteristics.

Accordingly, a network protocol may be learned and/or reverse-engineered specifically from messages sent and/or received by a single device (e.g., industrial device 208) within the industrial control system. Additionally or alternatively, a network protocol may be learned and/or reverse-engineered from messages sent and/or received by several or all of the devices (e.g., computing devices 202(1)-(N) and industrial device 208) within the industrial control system.

In one example, upon detecting and/or identifying such messages within network traffic, monitoring module 104 may identify parameters included in fields of the messages. For example, after profiling module 106 has deduced and/or inferred the network protocol from patterns found in the payload of certain messages, monitoring module 104 may identify parameters included in fields of the messages travelling through network 204. In this example, the fields of the messages may represent and/or correspond to the structure of the network protocol used to communicate with the devices included in the industrial control system. Examples of such parameters include, without limitation, opcodes, data, message size, message structure, message counts, transaction identifiers, payload content, sequence numbers, values, metadata, variations or combinations of one or more of the same, or any other suitable parameters.

Returning to FIG. 3, at step 304 one or more of the systems described herein may create a message protocol profile for the industrial device based at least in part on the network traffic. For example, profiling module 106 may, as part of server 206 in FIG. 2, create message protocol profile 120(1) in FIG. 2 for industrial device 208 based at least in part on the network traffic. In this example, message protocol profile 120(1) may identify and/or describe the network protocol used to communicate with industrial device 208. Additionally or alternatively, message protocol profile 120(1) may identify and/or describe normal communication patterns of industrial device 208. In other words, message protocol profile 120(1) may identify and/or describe typical payloads, parameters, and/or content included in messages sent and/or received by industrial device 208.

The systems described herein may perform step 304 in a variety of ways. In some examples, profiling module 106 may build a baseline representation of the normal communication patterns of industrial device 208 from the parameters included in the fields of the messages. For example, profiling module 106 may identify a grouping of messages that were carried in a specific component layer (e.g., Transport Layer 4), destined for the IP address of industrial device 208 (e.g., 192.168.2.17), and/or destined for a specific port number on industrial device 208 (e.g., port number 80). In this example, profiling module 106 may analyze this grouping to learn and/or identify typical payloads, parameters, and/or content included in messages sent to industrial device 208. Profiling module 106 may then insert and/or include a representation of those payloads, parameters, and/or content in the baseline representation of normal communication patterns of industrial device 208.

Additionally or alternatively, profiling module 106 may include and/or insert a description of the structure of the network protocol used to communicate with industrial device 208 in message protocol profile 120(1). In one example, the structure of the network protocol may be specific to industrial device 208. In another example, the structure of the network protocol may be common to all devices included in the industrial control system.

Figure 4:
FIG. 4 is an illustration of an exemplary message protocol profile created from messages detected within a network that facilitates communication for an industrial control system.

As a specific example, profiling module 106 may create and/or build message protocol profile 120(1) in FIG. 4 for industrial device 208. As illustrated in FIG. 4, message protocol profile 120(1) may include and/or identify the corresponding device (in this example, "Industrial Device 208"), the IP address of the device (in this example, "192.168.2.17"), the corresponding port number on the device (in this example, "80"), the component layer in which the messages were carried (in this example, "Transport Layer 4"), the payload structure of network protocol messages indicating which bytes represent the opcode (in this example, "Bytes 1 and 2"), which bytes represent the transaction identifier (in this example, "Bytes 3 and 4"), which bytes represent the parameters or values (in this example, "Bytes 5 through 10"), which bytes represent the sequence number (in this example, "Byte 11"), the sequence numbering scheme (in this example, "REQUEST: 0", "REQUEST ACKNOWLEDGE: 1", "DATA TRANSMISSION: 2", and "DATA RECEIPT ACKNOWLEDGE: 3"), the normal communication patterns of the device indicating the opcodes typically included in incoming messages (in this example, "0x010F", "0x00FF", "0x00AA", and "0x1234"), the parameters typically included in incoming messages (in this example, "0x000000 through 0x000FFF"), the opcodes typically included in outgoing messages (in this example, "0x0002", "0x121F", "0xFF00", and "0x1234"), and/or the parameters typically included in outgoing messages (in this example, "0x010101 and 0xFFFFFF").

In some examples, profiling module 106 may form and/or develop a set of policy rules that represent a reference for the normal communication patterns of industrial device 208. For example, profiling module 106 may analyze the parameters identified in the fields of the messages. In this example, profiling module 106 may then form and/or develop a set of policy rules based on the analysis of the parameters identified within those fields. Additionally or alternatively, profiling module 106 may label those policy rules in connection with the messages in which the parameters were identified. This set of policy rules may indicate and/or represent the normal communication patterns of industrial device 208. Accordingly, this set of policy rules may be used to determine, by way of comparison, whether future messages involving industrial device 208 represent anomalous communications.

In one example, the set of policy rules may be incorporated in and/or represented by a mathematical formula that facilitates calculating a risk score for devices that communicate with industrial device 208. For example, profiling module 106 may form and/or develop a mathematical formula that includes certain numerical values representing the level of risk associated with violating each of the policy rules. In this example, profiling module 106 may weight one or more of the numerical values depending on the significance of a violation of the corresponding policy rules. In other words, the weights may correspond to and/or be commensurate with how telling and/or meaningful the violation is to determining whether a certain device has been compromised.

Returning to FIG. 3, at step 306 one or more of the systems described herein may detect at least one message within the network that involves the industrial device and at least one other computing device included in the industrial control system. For example, detection module 108 may, as part of server 206 in FIG. 2, detect at least one message within network 204 that involves industrial device 208 and one or more of computing devices 202(1)-(N). In one example, this message may be sent by one of computing devices 202(1)-(N) to industrial device 208 via network 204. In another example, this message may be sent by industrial device 208 to one or more of computing device 208(1)-(N) via network 204.

Figure 5:
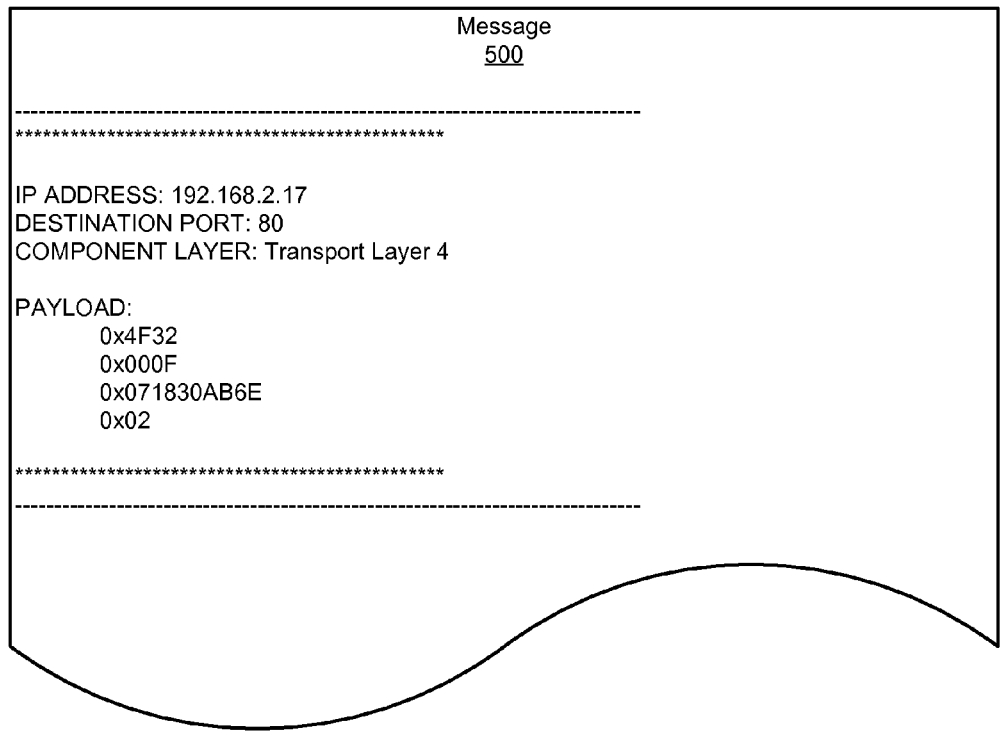
FIG. 5 is an illustration of an exemplary message detected within a network that facilitates communication for an industrial control system.

The systems described herein may perform step 306 in a variety of ways. In some examples, detection module 108 may detect and/or intercept the message while monitoring network traffic within network 204. For example, detection module 108 may detect and/or intercept message 500 in FIG. 5 on its way to industrial device 208 within network 204. As illustrated in FIG. 5, message 500 may identify the destination IP address (in this example, "192.168.2.17"), the destination port number (in this example, "80"), the component layer carrying the message (in this example, "Transport Layer 4"), the payload parameters that include bytes 1 and 2 (in this example, "0x4F32"), bytes 3 and 4 (in this example, "0x000F"), bytes 5 through 10 (in this example, "0x071830AB6E"), and byte 11 (in this example, "0x02").

In one example, determination module 110 may determine that the message shares certain characteristics with a grouping of messages that were destined for industrial device 208. For example, determination module 110 may determine that the message is encapsulated in accordance with the same component layer (e.g., Transport Layer 4), destined for the same IP address (e.g., 192.168.2.17), and/or destined for the same port number (e.g., port number 80) as the grouping of messages from which message protocol profile 120(1) was created. In this example, determination module 110 may arrive at this determination by comparing metadata found in the message against message protocol profile 120(1).

Returning to FIG. 3, at step 308 one or more of the systems described herein may determine that the message represents an anomaly by comparing the message with the message protocol profile for the industrial device. For example, determination module 110 may, as part of server 206 in FIG. 2, determine that the message represents an anomaly by comparing the message with message protocol profile 120(1). This anomaly may signify and/or suggest that the message is suspiciously inconsistent with the normal communication patterns of industrial device 208. The term "suspiciously inconsistent," as used herein with reference to normal communication patterns, generally refers to any type or form of deviation that corresponds and/or gives rise to a certain level of suspicion and/or doubt regarding the normalcy and/or legitimacy of a message.

The systems described herein may perform step 308 in a variety of ways. In some examples, determination module 110 may determine that the message represents the anomaly based at least in part on the parameters included in the fields of the message. For example, determination module 110 may identify certain parameters of the message, such as an opcode, the payload size, the sequence number, and/or the transaction identifier. In this example, determination module 110 may determine that at least one of those parameters identified within the message is suspiciously inconsistent with the baseline representation of the normal communication patterns of industrial device 208.

Returning to FIG. 3, at step 310 one or more of the systems described herein may determine that the other computing device has likely been compromised based at least in part on the message representing the anomaly. For example, determination module 110 may, as part of server 206 in FIG. 2, determine that one of computing devices 202(1)-(N) has likely been compromised based at least in part on the message representing an anomaly. In other words, since (1) the message involves that computing device and industrial device 208 and (2) the message represents an anomaly with respect to the normal communication patterns of industrial device 208, determination module 110 may determine that the computing device has been compromised by an attacker. As a result of this compromised state, the computing device may be sending messages that include illegitimate instructions to industrial device 208.

The systems described herein may perform step 310 in a variety of ways. In some examples, determination module 110 may determine that the computing device has been compromised based at least in part on a risk score for the computing device. For example, determination module 110 may calculate a risk score for computing device 202(1) that accounts for one or more messages sent by computing device 202(1) to industrial device 208. In this example, the risk score may be calculated by applying certain parameters of the message to the mathematical formula. As described above, this mathematical formula may incorporate and/or account for the set of policy rules that represent a reference for the normal communication patterns of industrial device 208.

Continuing with this example, the risk score may reflect whether the messages sent by computing device 202(1) violate any of the policy rules incorporated into the mathematical formula. Accordingly, in the event that the messages violate those policy rules incorporated in the mathematical formula to a sufficient degree, determination module 110 may determine that the risk score exceeds a certain threshold. As a result, determination module 110 may determine that computing device 202(1) has been compromised.

In response to the determination that one of computing devices 202(1)-(2) has been compromised, security module 112 may perform one or more security actions with respect to the compromised computing device. Examples of such security actions include, without limitation, raising an alarm that notifies at least one additional computing device about the compromised computing device, quarantining the compromised computing device from the industrial network to prevent the compromised computing device from communicating with any additional computing devices within the industrial control system, shutting down the compromised computing device to prevent the other computing device from communicating with any additional computing devices within the industrial control system, blocking all messages between the compromised computing device and any additional computing devices within the industrial control system, replacing the compromised computing device within the industrial network by transferring at least one computing task of the compromised computing device to at least one additional computing device within the industrial control system, variations or combinations of one or more of the same, or any other suitable security actions.

As a specific example, monitoring module 104 may monitor network traffic within a network that facilitates communication for an industrial control system that includes an arm actuator assigned 192.168.2.17 as its IP address. In this example, monitoring module 104 may detect and/or identify various messages that are encapsulated in accordance with Transport Layer 4 and destined for port number 80 at IP address 192.168.2.17. Monitoring module 104 may group those messages together based at least in part on their common characteristics. Upon grouping together a sufficient amount of messages that share those characteristics in common, monitoring module 104 may feed that grouping of messages to profiling module 106 to create a message protocol profile for the arm actuator.

In this example, profiling module 106 may build a baseline representation of the normal communication patterns of the arm actuator by analyzing that grouping of messages. For example, profiling module 106 may identify all of the valid opcodes received by the arm actuator in those messages. Additionally or alternatively, profiling module 106 may identify all of the data and/or values received by the arm actuator in those messages. Such data and/or values may represent valid angles of movement for the arm actuator. Profiling module 106 may include and/or insert the baseline representation of the normal communication patterns of the arm actuator in the message protocol profile for the arm actuator.

In the event that a controller included in the industrial control system becomes compromised by an attacker, the controller may begin sending illegitimate messages to the arm actuator. Such illegitimate messages may include invalid opcodes and/or invalid data or values. Accordingly, such illegitimate messages may include instructions that would, if executed by arm actuator, cause the arm actuator to perform invalid actions (such as moving the arm actuator to an invalid angle).

Continuing with this example, detection module 108 may detect and/or identify one of these illegitimate messages sent by the controller within the industrial network. Determination module 110 may determine that this illegitimate message represents an anomaly that is suspiciously inconsistent with the normal communication patterns of the arm actuator by comparing the illegitimate message with the message protocol profile for the arm actuator. Determination module 110 may also determine that the controller has been compromised because the illegitimate message represents an anomaly.

As explained above in connection with FIGS. 1-5, an industrial security technology may identify compromised devices within industrial control systems by implementing a two-phase approach. First, the industrial security technology may implement a training phase that involves collecting network traffic within an industrial control system by using a network grouper. In one example, the network grouper may group together sets of messages based on the Transport Layer 4 protocol, destination IP address, and destination port number. Upon collecting and grouping a sufficient amount of traffic into a set, the network grouper may pass the grouped set of messages to a network profiler that creates a message protocol profile based on the grouped set of messages.

The network profiler may label resulting message protocol profiles based on the grouped sets of messages used to create those profiles. The industrial security technology may consume the labelled message protocol profiles to create policy rules that represent the reference for normal communication patterns (e.g., normal message payloads) of the devices within the industrial control system.

Second, the industrial security technology may implement a detection phase that involves providing two feeds of information to an anomaly detector. In this example, one feed of information may include the policy rules created from the labelled message protocol profiles. Another feed of information may include messages collected by the network grouper while continuing to monitor the network traffic within the industrial control system. The anomaly detector may then apply the policy rules from the one feed to the messages from the other feed. By doing so, the anomaly detector may determine whether any of the messages violate the policy rules. In the event that certain violations occur, the industrial security technology may raise an alarm indicating that a particular device within the industrial control system has been compromised.

Figure 6:
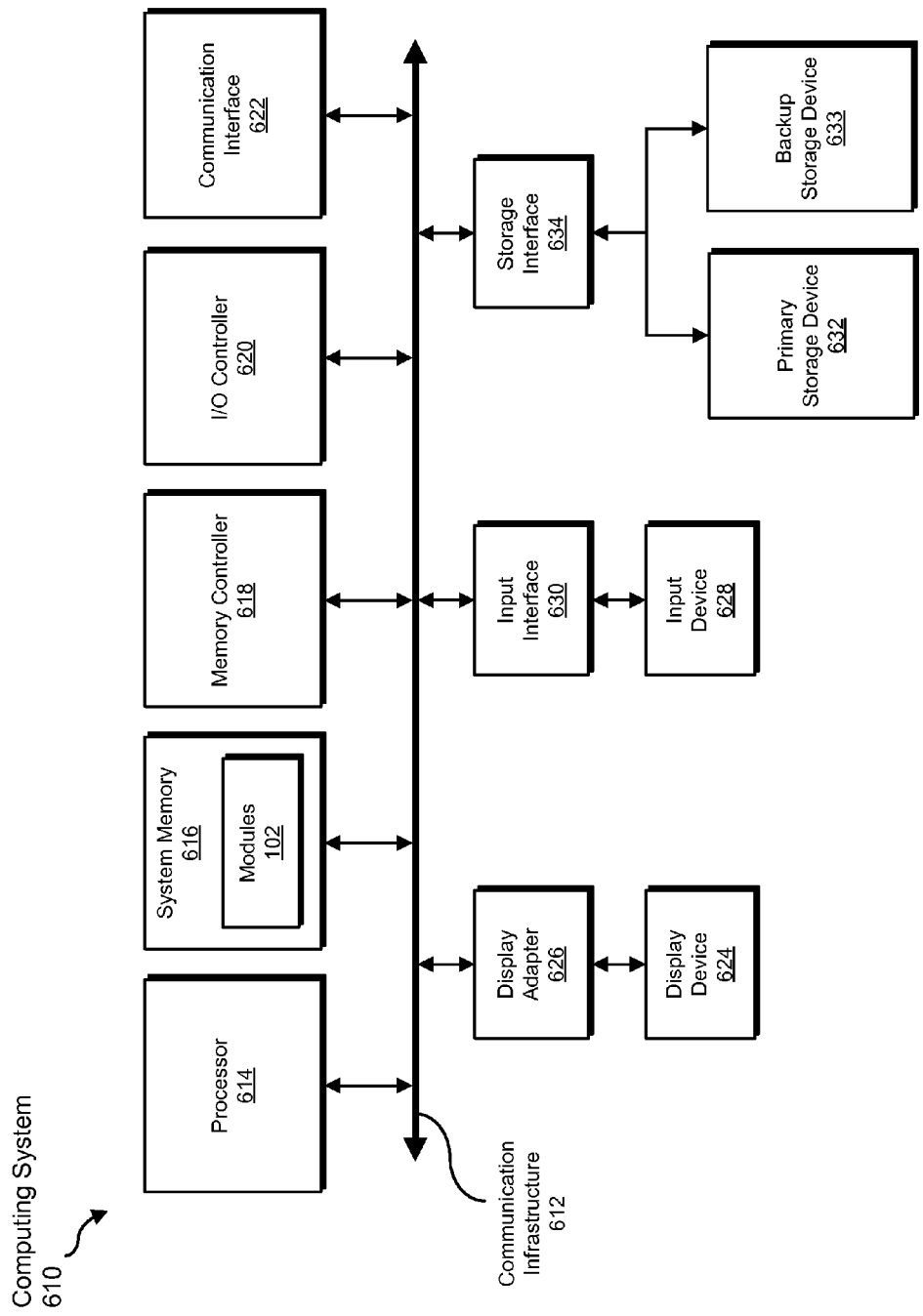
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
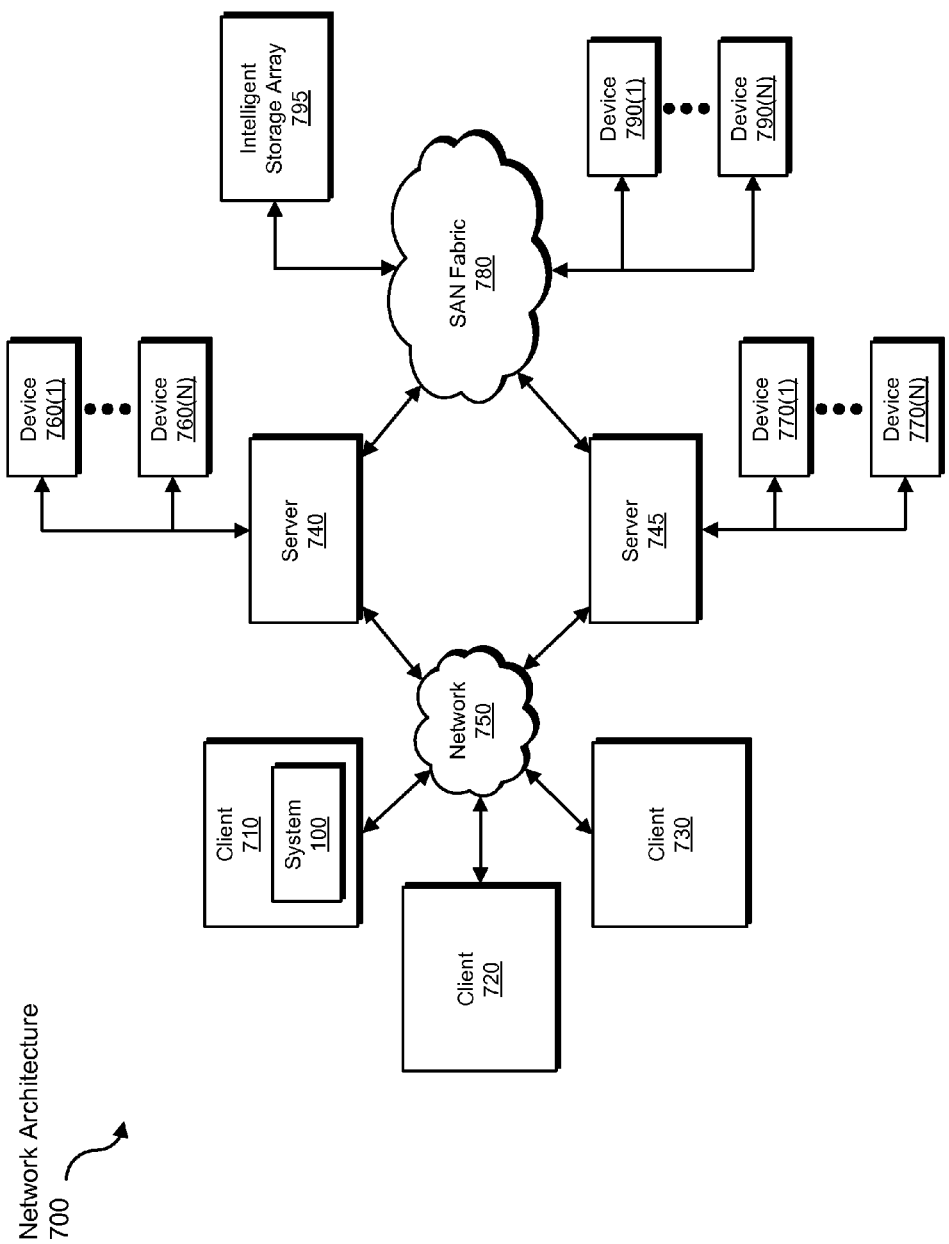
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying compromised devices within industrial control systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying compromised devices within industrial control systems, at least a portion of the method being performed by a computing device comprising at least one processor, the method comprising:
    monitoring network traffic within a network that facilitates communication for an industrial control system that includes at least one industrial device;
    creating, based at least in part on the network traffic, a message protocol profile for the industrial device that describes:
        a network protocol used to communicate with the industrial device via the network;
        normal communication patterns of the industrial device; and
        one or more valid opcodes for the industrial device;
    detecting at least one message within the network that involves the industrial device and at least one other computing device included in the industrial control system;
    identifying at least one opcode in the message;
    determining, by comparing the opcode identified in the message with the valid opcodes for the industrial device described in the message protocol profile, that the message represents an anomaly that is suspiciously inconsistent with the normal communication patterns of the industrial device; and
    determining, based at least in part on the message representing the anomaly, that the other computing device has likely been compromised.

2. The method of claim 1, further comprising, in response to determining that the other computing device has likely been compromised, performing at least one security action with respect to the other computing device.

3. The method of claim 2, wherein the security action comprises at least one of:
    raising an alarm that notifies at least one additional computing device that the other computing device has been compromised;
    quarantining the other computing device from the industrial network to prevent the other computing device from communicating with any additional computing devices within the industrial control system;
    shutting down the other computing device to prevent the other computing device from communicating with any additional computing devices within the industrial control system;
    blocking all messages between the other computing device and any additional computing devices within the industrial control system; and
    replacing the other computing device within the industrial network by transferring at least one computing task of the other computing device to at least one additional computing device within the industrial control system.

4. The method of claim 1, wherein monitoring the network traffic within the network comprises:
    detecting messages within the network that originate from or are destined for the industrial device; and
    identifying parameters included in fields of the messages.

5. The method of claim 4, wherein creating the message protocol profile for the industrial device comprises building a baseline representation of the normal communication patterns of the industrial device from the parameters included in the fields of the messages.

6. The method of claim 5, wherein:
- detecting the messages within the network that originate from or are destined for the industrial device comprises creating a grouping of messages that have certain characteristics in common with respect to the industrial device; and
- building the baseline representation of the normal communication patterns of the industrial device comprises building the baseline representation of the normal communication patterns of the industrial device by:
  - analyzing the grouping of messages; and
  - inserting a representation of the parameters identified in the fields of the messages into the baseline representation.

7. The method of claim 6, wherein detecting the message within the network that involves the industrial device and the other computing device comprises determining that the message and the grouping of messages share the certain characteristics in common.

8. The method of claim 7, wherein determining that the message represents the anomaly comprises:
- identifying at least one parameter included in at least one field of the message; and
- determining that the parameter identified in the field of the message is suspiciously inconsistent with the baseline representation of the normal communication patterns of the industrial device.

9. The method of claim 4, wherein building the baseline representation of the normal communication patterns of the industrial device comprises forming, based at least in part on the parameters identified in the fields of the messages, a set of policy rules that represent a reference for the normal communication patterns of the industrial device.

10. The method of claim 9, wherein forming the set of policy rules comprises weighting, within a mathematical formula that facilitates calculating a risk score for computing devices communicating with the industrial device, a numerical value that represents a level of risk associated with violating at least one policy rule within the set of policy rules.

11. The method of claim 4, wherein the parameters included in the fields of the messages comprise at least one of:
- an opcode included in a message originating from or destined for the industrial device;
- a size of a message originating from or destined for the industrial device;
- a structure of a message originating from or destined for the industrial device;
- a sequence number of a message originating from or destined for the industrial device;
- a counter that identifies a certain number of messages originating from or destined for the industrial device; and
- a transaction identifier included in a message originating from or destined for the industrial device.

12. A system for identifying compromised devices within industrial control systems, the system comprising:
- a monitoring module, stored in memory, that monitors network traffic within a network that facilitates communication for an industrial control system that includes at least one industrial device;
- a profiling module, stored in memory, that creates, based at least in part on the network traffic, a message protocol profile for the industrial device that describes:
  - a network protocol used to communicate with the industrial device via the network;
  - normal communication patterns of the industrial device; and
  - one or more valid opcodes for the industrial device;
- a detection module, stored in memory, that:
  - detects at least one message within the network that involves the industrial device and at least one other computing device; and
  - identifies at least one opcode in the message;
- a determination module, stored in memory, that:
  - determines, by comparing the opcode identified in the message with the valid opcodes for the industrial device described in the message protocol profile, that the message represents an anomaly that is suspiciously inconsistent with the normal communication patterns of the industrial device; and
  - determines, based at least in part on the message representing the anomaly, that the other computing device has likely been compromised; and
- at least one physical processor that executes the monitoring module, the profiling module, the detection module, and the determination module.

13. The system of claim 12, further comprising a security module, stored in memory, that performs at least one security action with respect to the other computing device in response to the determination that the other computing device has likely been compromised.

14. The system of claim 13, wherein the security action comprises at least one of:
- raising an alarm that notifies at least one additional computing device that the other computing device has been compromised;
- quarantining the other computing device from the industrial network to prevent the other computing device from communicating with any additional computing devices within the industrial control system;
- shutting down the other computing device to prevent the other computing device from communicating with any additional computing devices within the industrial control system;
- blocking all messages between the other computing device and any additional computing devices within the industrial control system; and
- replacing the other computing device within the industrial network by transferring at least one computing task of the other computing device to at least one additional computing device within the industrial control system.

15. The system of claim 12, wherein the monitoring module:
- detects messages within the network that originate from or are destined for the industrial device; and
- identifies parameters included in fields of the messages.

16. The system of claim 15, wherein the profiling module builds a baseline representation of the normal communication patterns of the industrial device from the parameters included in the fields of the messages.

17. The system of claim 16, wherein:
- the monitoring module creates a grouping of messages that have certain characteristics in common with respect to the industrial device; and
- the profiling module builds the baseline representation of the normal communication patterns of the industrial device by:
  - analyzing the grouping of messages; and
  - inserting a representation of the parameters identified in the fields of the messages into the baseline representation.

18. The system of claim 17, wherein the determination module determines that the message and the grouping of messages share the certain characteristics in common.

19. The system of claim 15, wherein the parameters included in the fields of the messages comprise at least one of:
- an opcode included in a message originating from or destined for the industrial device;
- a size of a message originating from or destined for the industrial device;
- a structure of a message originating from or destined for the industrial device;
- a sequence number of a message originating from or destined for the industrial device;
- a counter that identifies a certain number of messages originating from or destined for the industrial device; and
- a transaction identifier included in a message originating from or destined for the industrial device.

20. A non-transitory computer-readable medium comprising one or more computer-executable instructions that, when executed by at least one processor of a computing device, cause the computing device to:
- monitor network traffic within a network that facilitates communication for an industrial control system that includes at least one industrial device;
- create, based at least in part on the network traffic, a message protocol profile for the industrial device that describes:
  - a network protocol used to communicate with the industrial device via the network;
  - normal communication patterns of the industrial device; and
  - one or more valid opcodes for the industrial device;
- detect at least one message within the network that involves the industrial device and at least one other computing device included in the industrial control system;
- identify at least one opcode in the message;
- determine, by comparing the opcode identified in the message with the valid opcodes for the industrial device described in the message protocol profile, that the message represents an anomaly that is suspiciously inconsistent with the normal communication patterns of the industrial device; and
- determine, based at least in part on the message representing the anomaly, that the other computing device has likely been compromised.

* * * * *